UNITED STATES PATENT OFFICE.

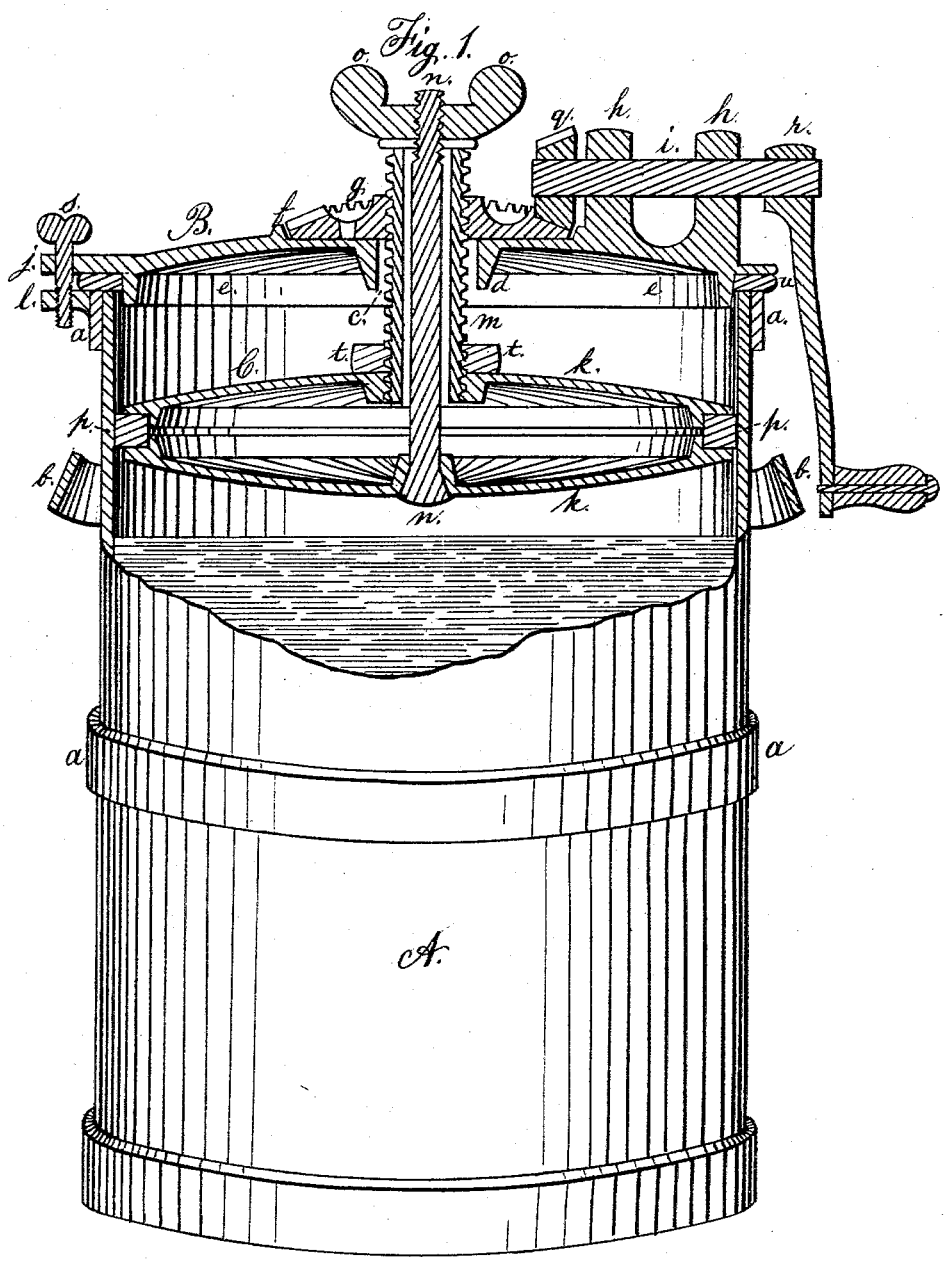

JAY W. POWERS, OF PORTAGE, WISCONSIN.

IMPROVEMENT IN CREAM-RAISING APPARATUS.

Specification forming part of Letters Patent No. 210,876, dated December 17, 1878; application filed August 19, 1878.

*To all whom it may concern:*

Be it known that I, JAY W. POWERS, of Portage, in the county of Columbia and State of Wisconsin, have invented a new and useful Improvement in Cream-Raising Apparatus, of which the following is a specification:

The invention relates to a process of seperating the cream from milk by placing the milk to be treated under the influence of a vacuum.

Heretofore the apparatus employed for that purpose has consisted, mainly, of open pans, which are objectionable, inasmuch as milk and cream, being absorbents, will take up and retain any bad odors with which the air may be impregnated, and the milk therein is exposed to dust and the ravages of insects.

Another apparatus has recently been invented wherein the milk has been kept from the air, dust, and insects, which greatly facilitates the raising of cream and materially lessens the labor of the dairy, but which is also defective, as the cream and butter thus produced retain the odors peculiar to new milk, called usually the "animal odors."

The object of my invention is to raise the cream quickly, preserve the milk sweet for cheese-making or other purposes, to protect it from bad air, dust, or insects, and to remove from it the unpleasant animal odors.

In carrying out my invention, I construct a milk-vessel of any suitable material, and of a size proportionate to the quantity of milk to be treated. Such vessel should, however, be cylindrical, or have a cylindrical section, as will hereinafter be explained. Into such vessel I place the milk, not filling it to its full capacity, but leaving a space above it for a vacuum-chamber. I then lower to the surface of the milk a piston adapted to this or other purposes to which pistons are applicable. Then, by a suitable mechanical device, I draw the piston upward, thus forcing the air out of the vessel, and leaving the milk exposed to the influence of a vacuum.

The invention is illustrated more in detail in the accompanying drawing, in which similar letters of reference indicate like parts.

In Figure 1 of the drawing, which is a vertical section, A is the vessel for holding the milk. B is the cover, and C the piston.

The vessel A, when constructed of sheet metal, is protected by strong bands $a\,a\,a\,a$, to preserve its cylindrical form and prevent its collapsing when the vacuum is produced therein.

Attached to the upper band are the lugs $l$, through which thumb-screws pass in fastening down the cover. The handles $b\,b$ are for lifting or carrying the vessel.

The cover B is provided in its center with a hole, $c$, through which the piston-rod passes, surrounding which, on the lower surface of the cover, is a thimble, $d$, the purpose of which will hereinafter be described.

Upon the upper surface of the cover, surrounding the hole $c$, is attached a ring, $f$, within which is a recess for the revolving nut $g$ to ride in. Outside this recess are the bearings $h\,h$, to support the crank-shaft $i$ in its proper position, and on the outer edge of the cover are the lugs $j$, which correspond to the lugs $l$ on the band below, with which they are connected by the thumb-screws $s$. On the lower surface of the cover is the ring or guard $e$, to keep it in place upon the vessel A.

The piston C, I construct of two metallic plates, $k\,k$, which may be concavo-convex, plano-convex, or plane.

Attached to the upper piston-plate is the tubular piston-rod $m$, having a screw-thread cut upon its outer surface, and to the lower piston-plate is attached the tightening-rod $n$, which passes through the hollow piston-rod, and has at its outer end a screw-thread, which engages the corresponding screw-thread in the nut $o$, which rests upon the top of the piston-rod.

A rubber ring or gasket, $p$, is held firmly between the two piston-plates $k\,k$, and may be expanded or contracted, as will hereinafter be described.

The revolving nut $g$ is tapped, having a screw-thread to correspond to and engage the screw-threads upon the piston-rod, for the purpose of raising the latter, and at its outer edge it is provided with bevel-gear, which interlocks with corresponding bevel-pinion $q$.

The crank $r$ is for the purpose of revolving, by means of the shaft $i$, the pinion $q$, which, interlocking with the nut $g$, raises the piston.

Surrounding the piston-rod, and resting upon the upper piston-plate, is the elastic cushion $t$, which presses against the thimble $d$ of the cover when the piston is drawn up.

In operating my device, I place the milk to be treated within the vessel A to within a few inches of the top. I then place the piston C, connected with the cover by the piston-rod and nut, as shown in the drawing, and lower it to the surface of the milk, the air which I thus displace passing upward around the outer periphery of the piston. I then adjust the cover to position, and fasten it by means of the thumb-screws $s$ or their equivalents; then, by screwing down the tightening-nut $o$, I draw the two piston-plates together, thus compressing the rubber gasket and forcing it outward against the interior surface of the vessel, rendering the same airtight; then, by revolving the crank $r$ through the medium of the pinion $q$ and nut $g$, I draw the piston upward to the cover, the air above it being forced out through the hole $c$ in the cover, through which the piston-rod passes, and through a hole in the nut $g$, made for that purpose. When the piston is drawn up far enough, the elastic cushion $t$ presses against the thimble $d$ of the cover, thus closing the aperture through which the air has escaped, and the vacuum produced is secure.

Other means may be employed to produce a vacuum for the purpose specified—as, for instance, having a cover or case to shut down over or on the outside of a milk-vessel, with packing between them, and the vacuum produced by lifting or drawing up the outer case or cover while the vessel is held down, or by drawing or forcing down the vessel while the case or cover is held up; or a partial vacuum may be produced by placing within the vacuum-chamber, or within a vessel connected therewith, a lighted lamp, and exhausting the oxygen from the air; but I regard the operating of a piston within a cylindrical vessel by a proper mechanical device as preferable.

By thus removing the atmospheric pressure from the milk, the process of separation is very rapid, the cream produced is of superior and uniform quality, and, not having been exposed to the air to become toughened, is easily converted into butter.

The animal odors referred to above are contained in the small quantity of air which is in the milk, which air, by means of the vacuum, is exhausted therefrom, and while it remains in the vacuum-chamber, which it does until the cover is removed and it is allowed to escape, the quality of the cream is not impaired or affected thereby, and the butter produced therefrom is of surpassing sweetness and purity.

I do not wish to confine myself to the particular form of the parts shown, as the construction may be materially changed without departing from the spirit of my invention.

The vessel may be of any other shape than that of a cylinder; or may be larger at the bottom than at the top, provided it has a section of uniform size, within which the piston plays.

I do not claim the operating of a piston within a milk-vessel for the purpose of producing a vacuum therein, that having been known and used; but What I do claim, and desire to secure by Letters Patent, is—

1. In a vacuum milk-vessel, the cover B, provided with the hole $c$, ring $f$, bearings $h\ h$, packing $u$, lugs $j$, and guard $e$, and in connection therewith the crank $r$, pinion $q$, and nut $g$, arranged substantially as and for the purposes specified.

2. In the piston C, the combination of the upper and lower plates, $k\ k$, with the hollow piston-rod $m$, the tightening-rod $n$, tightening-nut $o$, and the gasket $p$, for the purposes specified.

JAY W. POWERS.

Witnesses:
A. H. ARMOR,
E. S. PURDY.